(12) United States Patent
Carmen (10) Patent No.: US 8,334,663 B2
(45) Date of Patent: Dec. 18, 2012

(54) POWER SUPPLY FOR A LOAD CONTROL DEVICE

(75) Inventor: Daniel F. Carmen, Schnecksville, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 174 days.

(21) Appl. No.: 12/846,942

(22) Filed: Jul. 30, 2010

(65) Prior Publication Data

US 2012/0025802 A1   Feb. 2, 2012

(51) Int. Cl.
*H05B 37/02* (2006.01)
(52) U.S. Cl. .............. 315/307; 315/294; 315/241 R
(58) Field of Classification Search ............. 315/307, 315/116, 129, 130, DIG. 7, 194, 294, 241 R
See application file for complete search history.

(56) References Cited

U.S. PATENT DOCUMENTS

| | | | |
|---|---|---|---|
| 5,365,154 A | 11/1994 | Schneider et al. | |
| 5,736,795 A | 4/1998 | Zuehlke | |
| 5,811,963 A | 9/1998 | Elwell | |
| 5,903,139 A | 5/1999 | Kompelien | |
| 6,262,565 B1 | 7/2001 | Williams et al. | |
| 6,396,672 B1 | 5/2002 | Deam | |
| 6,969,959 B2 | 11/2005 | Black et al. | |
| 7,012,518 B2 | 3/2006 | Novikov | |
| 7,190,124 B2 | 3/2007 | Kumar et al. | |
| 7,196,892 B2 * | 3/2007 | Gabriel | 361/118 |
| 7,242,150 B2 | 7/2007 | DeJonge et al. | |
| 7,265,498 B2 * | 9/2007 | Liu | 315/224 |
| 7,423,413 B2 | 9/2008 | Dobbins et al. | |
| 7,432,661 B2 | 10/2008 | Taipale et al. | |
| 7,446,486 B2 | 11/2008 | Steffie et al. | |
| 7,542,258 B2 | 6/2009 | Black | |
| 7,546,473 B2 | 6/2009 | Newman | |

(Continued)

FOREIGN PATENT DOCUMENTS

DE   10132514 A1   1/2003
(Continued)

OTHER PUBLICATIONS

European Patent Office, International Search Report and Written Opinion for International Patent Application No. PCT/US2011/045851, Nov. 23, 2011, 14 pages.

*Primary Examiner* — James H Cho
(74) *Attorney, Agent, or Firm* — Mark E. Rose; Philip N. Smith; Bridget L. McDonough (57) ABSTRACT

A load control device adapted to be coupled between an AC power source and an electrical load for controlling the power delivered to the load includes a power supply having an energy storage capacitor and a charge pump circuit adapted to conduct an input charging current through the load and to conduct an output charging current through the energy storage capacitor to thus generate a DC supply voltage across the energy storage capacitor, where the output charging current has a magnitude greater than the input charging current. The charge pump circuit includes a switched capacitor operable to charge through the load during a first half-cycle, and to discharge into the energy storage capacitor in a second, subsequent half-cycle. The charge pump circuit operates at line frequency and the magnitude of the input charging current is substantially small so as to avoid generating noise in a noise-sensitive circuit of the load control device.

30 Claims, 8 Drawing Sheets

Fig. 2

U.S. PATENT DOCUMENTS

| | | |
|---|---|---|
| 7,564,227 B2 | 7/2009 | Dobbins et al. |
| 7,719,817 B2 | 5/2010 | Newman, Jr. |
| 7,728,564 B2 | 6/2010 | Fricke et al. |
| 2005/0062441 A1 | 3/2005 | Gonthier et al. |
| 2009/0160409 A1 | 6/2009 | Carmen |
| 2009/0273958 A1 | 11/2009 | Baby |
| 2010/0052894 A1 | 3/2010 | Steiner et al. |
| 2010/0270982 A1 | 10/2010 | Hausman, Jr. et al. |

FOREIGN PATENT DOCUMENTS

| | | |
|---|---|---|
| WO | WO 2005114839 A1 | 12/2005 |

* cited by examiner

POWER SUPPLY FOR A LOAD CONTROL DEVICE

BACKGROUND OF THE INVENTION

1. Field of the Invention

The present invention relates to load control devices for control of the power delivered from an alternating-current (AC) power source to an electrical load, and more particularly, to a two-wire electronic switch having a power supply that draws only a small amount of current through the load when the load is off.

2. Description of the Related Art

Typical load control devices are operable to control the amount of power delivered to an electrical load, such as a lighting load or a motor load, from an alternating-current (AC) power source. Wall-mounted load control devices are adapted to be mounted to standard electrical wallboxes. A dimmer switch comprises a controllably conductive device (e.g., a bidirectional semiconductor switch, such as, a triac), which is coupled in series between the power source and the load. The controllably conductive device is controlled to be conductive and non-conductive for portions of a half-cycle of the AC power source to thus control the amount of power delivered to the load (e.g., using a phase-control dimming technique). A "smart" dimmer switch (i.e., a digital dimmer switch) comprises a microprocessor (or similar controller) for controlling the semiconductor switch and a power supply for powering the microprocessor. In addition, the smart dimmer switch may comprise a memory, a communication circuit, and a plurality of light-emitting diodes (LEDs) that are all powered by the power supply.

An electronic switch (i.e., a digital switch) comprises a controllably conductive device (such as a relay or a bidirectional semiconductor switch), a microprocessor, and a power supply. In contrast to a smart dimmer switch, the controllably conductive device of an electronic switch is not controlled using the phase-controlled dimming technique, but is controlled to be either conductive or non-conductive during each half-cycle of the AC power source to thus toggle the electrical load on and off. Often, wall-mounted electronic switches do not require a connection to the neutral side of the AC power source (i.e., the electronic switch is a "two-wire" device). This is particularly useful when the electronic switch is installed in a retro-fit installation (i.e., to replace an existing switch or load control device in an electrical wallbox in which there is no neutral connection).

In order to charge, the power supply of a two-wire electronic switch must develop an amount of voltage across the power supply. As a result, not all of the AC line voltage of the AC power source is available to power the electrical load and the electrical load may not operate properly when the two-wire electronic switch is controlling the load to be on. For example, if the electrical load is a lighting load, the lighting load may not be illuminated to the maximum possible intensity. In addition, the power supply must draw current through the controlled electrical load in order to charge, which may cause problems for some types of electrical loads. For example, when the electrical load is a lighting load, the magnitude of the power supply current must not be great enough to cause the lighting load to illuminate or to flicker when the load is being controlled to be off. Further, some electrical loads, such as compact fluorescent lamps, do not conduct sinusoidal currents, and as a result, current cannot be conducted through these electrical loads during certain portions of the line cycle of the AC power source.

Therefore, there exists a need for an electronic switch that has a controller for turning the load on and off and a power supply that operates in a manner that does not result in inappropriate operation of the load.

SUMMARY OF THE INVENTION

According to an embodiment of the present invention, a load control device adapted to be coupled between an AC power source and an electrical load for controlling the power delivered to the load comprises a power supply having an energy storage capacitor and a charge pump circuit adapted to conduct an input charging current through the load and to conduct an output charging current through the energy storage capacitor to thus generate a DC supply voltage across the energy storage capacitor, where the output charging current has a magnitude greater than the input charging current. The load control device further comprises a controllably conductive device adapted to be coupled between the source and the load for controlling the power delivered to the load, and a controller operatively coupled to a control input of the controllably conductive device for rendering the controllably conductive device conductive and non-conductive. The power supply is coupled in parallel with controllably conductive device for generating the DC supply voltage for powering the controller when the controllably conductive device is non-conductive. The charge pump circuit operates at a switching frequency equal to approximately a line frequency of the AC power source.

According to another embodiment of the present invention, a load control device adapted to be coupled between an AC power source and an electrical load for controlling the power delivered to the load comprises a noise-sensitive circuit, and a power supply comprising an energy storage capacitor and a switched capacitor circuit adapted to conduct a leakage current through the load and to conduct a discharge current through the energy storage capacitor at a predetermined switching frequency to thus generate a DC supply voltage across the energy storage capacitor, where the magnitude of the leakage current and the predetermined switching frequency are both substantially small so as to avoid generating noise in the noise-sensitive circuit. The load control device further comprises a controllably conductive device adapted to be coupled between the source and the load for controlling the power delivered to the load, and a controller operatively coupled to a control input of the controllably conductive device for rendering the controllably conductive device conductive and non-conductive. The noise-sensitive circuit is coupled to the controller, such that the controller is responsive to the noise-sensitive circuit. The power supply is coupled in parallel with the controllably conductive device for generating the DC supply voltage for powering the controller and the noise-sensitive circuit when the controllably conductive device is non-conductive.

In addition, a power supply for a two-wire load control device adapted to be coupled between an AC power source and an electrical load for controlling the power delivered to the load is also described herein. The power supply comprises an energy storage capacitor operable to store a DC supply voltage, and at least two switched capacitors adapted to be electrically coupled in series during a first half-cycle, and in parallel during a second, subsequent half-cycle. The series-connected capacitors conduct a first charging current during the first half-cycle, and each conduct an individual discharge current during the second half-cycle. The energy storage capacitor conducts the discharge currents of each of the switched capacitors during the second half-cycle, such that the energy storage capacitor conducts a second charge current, which is the sum of the discharge currents of the switched capacitors and has a magnitude greater than the magnitude of the first charging current.

According to another embodiment of the present invention, a power supply for a two-wire load control device for controlling the power delivered from an AC power source to an electrical load comprises an energy storage capacitor for storing a DC supply voltage, and first and second switched capacitors operable to charge during the positive and negative half-cycles of the AC power source, respectively. The energy storage capacitor is coupled to the first and second switched capacitors, such that the first and second switched capacitors are operable to discharge into the energy storage capacitor during the negative and positive half-cycles, respectively, and the DC supply voltage is produced across the energy storage capacitor. The power supply further comprises first and second switching devices. The first switching device is operatively coupled in between the first switched capacitor and the energy storage capacitor and is rendered conductive during the negative half-cycles, such that the first switched capacitor is operable to discharge into the energy storage capacitor during the negative half-cycles. The second switching device is operatively coupled in between the second switched capacitor and the energy storage capacitor and is rendered conductive during the positive half-cycles, such that the second switched capacitor is operable to discharge into the energy storage capacitor during the positive half-cycles. The second switching device is rendered conductive in response to the first switched capacitor charging during the positive half-cycles.

According to another embodiment of the present invention, a power supply for a load control device for controlling the power delivered from an AC power source to an electrical load comprises an energy storage capacitor for storing a DC supply voltage, a switched capacitor circuit, and a current limit circuit. The switched capacitor circuit comprises a switched capacitor and a switching device. The switched capacitor conducts a charging current through the load when the switching device is non-conductive, and conducts a discharge current into the energy storage capacitor when the switching device is conductive. The switching device is rendered conductive and non-conductive at a predetermined frequency, such that the DC supply voltage is produced across the energy storage capacitor. The current limit circuit is coupled in series with the switched capacitor circuit for limiting the magnitude of the charging current.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 1:
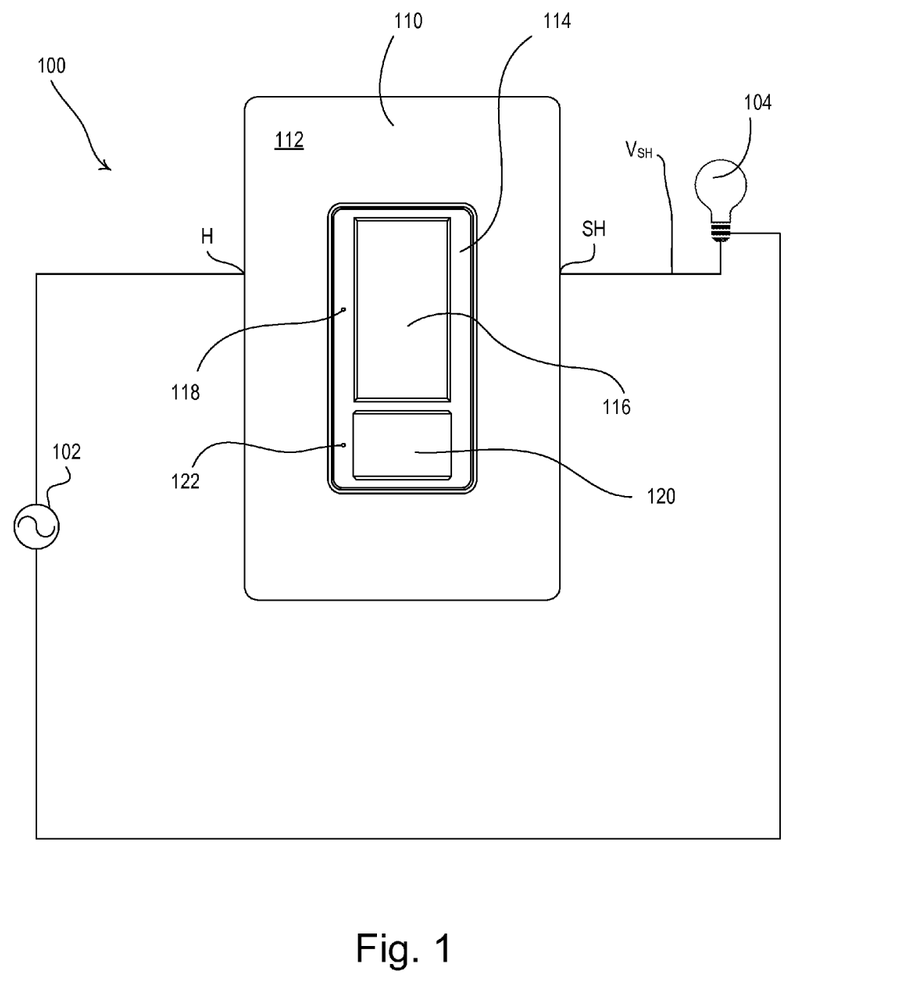
FIG. 1 is a simplified diagram of a lighting control system comprising a two-wire electronic switch according to an embodiment of the present invention.

FIG. 1 is a simple block diagram of a lighting control system 100 including a two-wire electronic switch 110 according to an embodiment of the present invention. The electronic switch 110 comprises a hot terminal H and a switched hot terminal SH and is adapted to be coupled in series electrical connection between an alternating current (AC) power source 102 (e.g., 120 $V_{AC}$ @ 60 Hz or 240 $V_{AC}$ @ 50 Hz) and a lighting load 104 for controlling the power delivered to the lighting load (e.g., an incandescent lamp as shown in FIG. 1). The electronic switch 110 generates a switched hot voltage $V_{SH}$ at the switched hot terminal SH, which is coupled to the lighting load 104. Alternatively, the lighting load 104 could comprise a light-emitting diode (LED) driver and a controlled LED light source, an electronic dimming ballast and a controlled gas discharge lamp, a magnetic low-voltage lamp, an electronic low-voltage lamp, a screw-in compact fluorescent lamp, a combination of any of these lighting sources, or any other suitable type of lighting source.

As shown in FIG. 1, the electronic switch 110 is adapted to be wall-mounted in a standard electrical wallbox. The electronic switch 110 comprises a faceplate 112 and a bezel 114 received in an opening of the faceplate. The electronic switch 110 further comprises a control actuator 116 (i.e., a control button) that may be actuated by a user for toggling (i.e., turning off and on) the lighting load 104, and a load visual indicator 118 for providing feedback of whether the lighting load is on or off. Alternatively, the electronic switch 110 could be implemented as a controllable screw-in module adapted to be screwed into an electrical socket (e.g., an Edison socket) of a lamp, or as a plug-in load control device adapted to be plugged into a standard electrical receptacle for receipt of power and further adapted to have a plug-in electrical load electrically connected thereto.

The electronic switch 110 also operates as an occupancy sensor to turn on the lighting load 104 in response to the presence of an occupant in the vicinity of the electronic switch (i.e., an occupancy condition), and to turn off the lighting load in response to the absence of the occupant (i.e., a vacancy condition). The electronic switch 110 comprises a lens 120 for directing the infrared energy from the occupant to an internal detector of an occupancy detection circuit 230 (FIG. 2), such that the electronic switch is operable to detect the occupancy and vacancy conditions. The electronic switch 110 comprises an occupancy visual indicator 122 that is illuminated when the electronic switch has detected an occupancy condition in the space.

Alternatively, the electronic switch 110 could operate as a vacancy sensor. When operating as a vacancy sensor, the electronic switch 110 would only operate to turn off the lighting load 104 in response to detecting a vacancy condition in the space. The electronic switch 110 would not turn on the lighting load 104 in response to detecting an occupancy condition. Therefore, when the electronic switch 110 operates as a vacancy sensor, the lighting load 104 must be turned on manually (e.g., in response to a manual actuation of the control actuator 116). Examples of occupancy and vacancy sensors are described in greater detail in U.S. patent application Ser. No. 12/203,500, filed Sep. 3, 2008, entitled BATTERY-POWERED OCCUPANCY SENSOR, the entire disclosure of which is hereby incorporated by reference.

Figure 2:
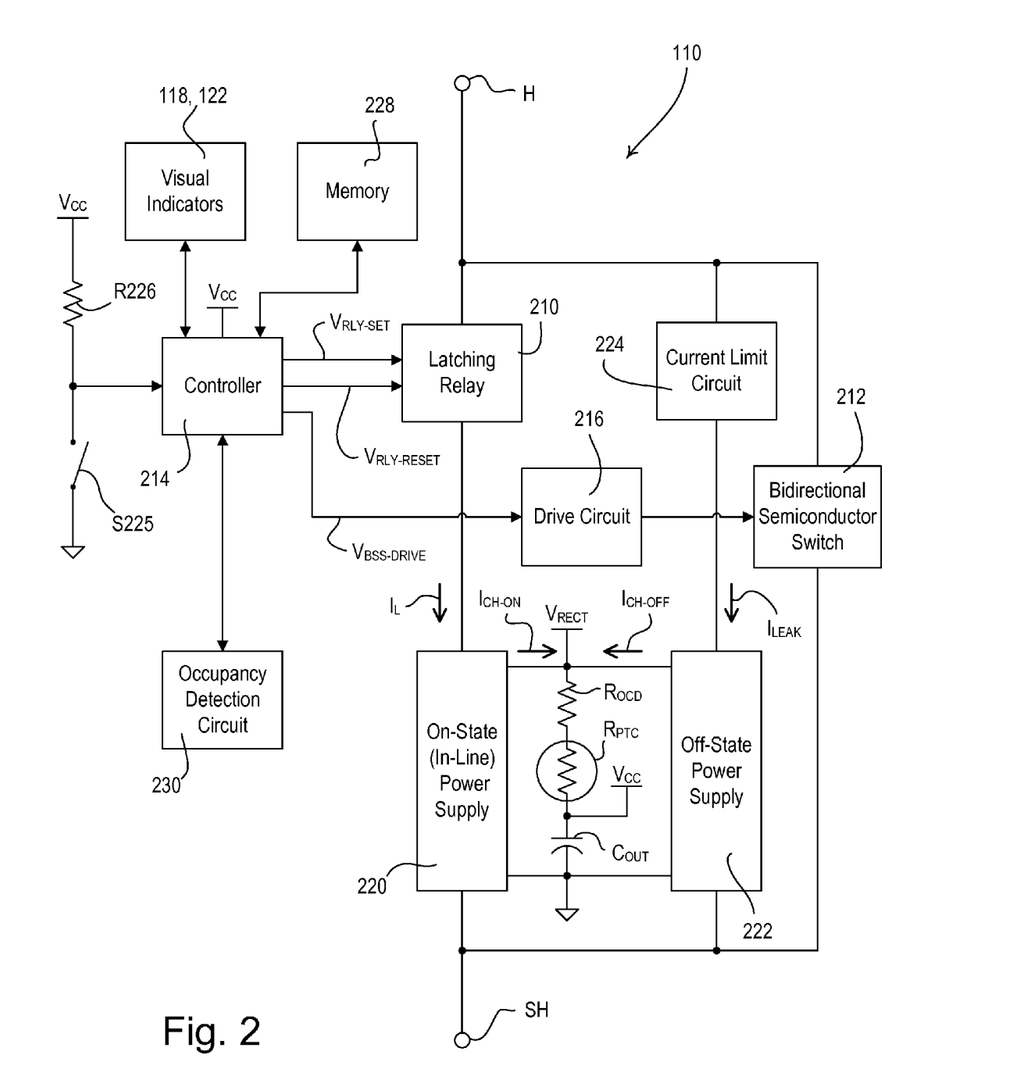
FIG. 2 is a simplified block diagram of the two-wire electronic switch of FIG. 1.

FIG. 2 is a simplified block diagram of the electronic switch 110. The electronic switch 110 comprises a controllably conductive device (e.g., a latching relay 210) connected in series electrical connection between the hot terminal H and the switched hot terminal SH. The relay 210 conducts a load current $I_L$ from the AC power source 102 to the lighting load 104 when the relay is closed (i.e., conductive). The load current $I_L$ may have, for example, a magnitude of approximately five amps depending upon the type of lighting load 104. The electronic switch 110 further comprises a bidirectional semiconductor switch 212 coupled in parallel electrical connection with the relay 210 for minimizing the inrush current conducted through the relay 210 (and thus limiting any arcing that may occur at the contacts of the relay) when the lighting load 104 is first turned on. Specifically, the bidirectional semiconductor switch 212 is controlled to be conductive before the relay 210 is rendered conductive when the electronic switch 110 is turning on the lighting load 104, and is controlled to be non-conductive after the relay is rendered non-conductive when the electronic switch is turning off the lighting load. The bidirectional semiconductor switch 212 may comprise, for example, a triac, a field-effect transistor (FET) in a rectifier bridge, two FETs in anti-series connection, one or more silicon-controlled rectifiers (SCRs), one or more insulated-gate bipolar junction transistors (IGBTs), or any other suitable type of bidirectional semiconductor switch.

The relay 210 and the bidirectional semiconductor switch 212 are independently controlled by a controller 214. For example, the controller 214 may be a microcontroller, but may alternatively be any suitable processing device, such as a programmable logic device (PLD), a microprocessor, an application specific integrated circuit (ASIC), or a field-programmable gate array (FPGA). The controller 214 is coupled to SET and RESET terminals (e.g., SET and RESET coils) of the relay 210 for causing the relay to become conductive and non-conductive, respectively. Specifically, the controller 214 generates a relay-set control signal $V_{RLY\text{-}SET}$ for driving the SET coil and a relay-reset control signal $V_{RLY\text{-}RESET}$ for driving the RESET coil. When the controller 214 drives the relay-set control signal $V_{RLY\text{-}SET}$ low to approximately circuit common, the mechanical switch of the relay 210 is rendered conductive. When the controller 214 drives the relay-reset control signal $V_{RLY\text{-}RESET}$ low to approximately circuit common during normal operating conditions, the mechanical switch of the relay 210 is rendered non-conductive. The controller 214 also provides a BSS-drive control signal $V_{BSS\text{-}DRIVE}$ to a control input of the bidirectional semiconductor switch 212 via a gate drive circuit 216 for rendering the bidirectional semiconductor switch conductive.

The controller 214 receives inputs from a momentary tactile (i.e., mechanical) switch S225, which temporarily closes in response to actuations of the control actuator 116 of the electronic switch 110. The series combination of the switch S225 and a resistor R226 (e.g., having a resistance of approximately 15 kΩ) is coupled between the DC supply voltage $V_{CC}$ and circuit common. When the control actuator 116 is actuated and the switch S225 is temporarily closed, the input port of the controller 214 to which the switch is coupled is pulled down towards circuit common, thus signaling to the controller 214 that the switch S225 has been actuated. Accordingly, the controller 214 is operable to control the relay 210 and the bidirectional semiconductor switch 212 to toggle the lighting load 104 on and off in response to actuations of the switch S225. The controller 214 is further operable to control the visual indicator 118 to be illuminated when the lighting load 104 is on and not illuminated when the lighting load is off. The controller 214 is also coupled to a memory 228 for storage of operational characteristics of the electronic switch 110. The memory 228 may be implemented as an external integrated circuit (IC) or as an internal circuit of the controller 214.

As previously mentioned, the electronic switch 110 comprises an occupancy detection circuit 230 that includes the internal detector, e.g., a pyroelectric infrared (PIR) detector. The internal detector is mounted in the electronic switch 110 so as to receive the infrared energy of the occupant in the space through the lens 120. The controller 214 is coupled to the occupancy detection circuit 230, such that the controller is operable to process the output of the internal detector to determine whether an occupancy condition or a vacancy condition is presently occurring in the space, for example, by comparing the output of the PIR detector to a predetermined occupancy voltage threshold. Alternatively, the internal detector could comprise an ultrasonic detector, a microwave detector, or any combination of PIR detectors, ultrasonic detectors, and microwave detectors. The controller 214 operates in an "occupied" state or a "vacant" state in response to the detections of occupancy or vacancy conditions, respectively, in the space. The controller 214 is operable to control the relay 210 and the bidirectional semiconductor switch 212 in response to the occupancy detection circuit 230. The controller 214 is further operable to control the occupancy visual indicator 122 to be illuminated when the occupancy detection circuit 230 has detected an occupancy condition.

The electronic switch 110 may further comprise a radio-frequency (RF) transceiver (not shown) and an antenna (not shown) for transmitting and receiving RF signals. The controller 214 may be operable to control the relay 210 and the bidirectional semiconductor switch 212 in response to the digital messages received via the RF signals. Examples of RF load control devices and antennas for wall-mounted load control devices are described in greater detail in commonly-assigned U.S. Pat. No. 5,982,103, issued Nov. 9, 1999, and U.S. Pat. No. 7,362,285, issued Apr. 22, 2008, both entitled COMPACT RADIO FREQUENCY TRANSMITTING AND RECEIVING ANTENNA AND CONTROL DEVICE EMPLOYING SAME, the entire disclosures of which are hereby incorporated by reference.

The electronic switch 110 comprises two power supplies: an on-state (in-line) power supply 220 and an off-state power supply 222. Both power supplies 220, 222 operate to generate a DC supply voltage $V_{CC}$ (e.g., having an average magnitude of approximately five volts) across an output capacitor $C_{OUT}$ (i.e., an energy storage capacitor), which may have, for example, a capacitance of approximately 680 µF. The controller 214 and other low-voltage circuitry of the electronic switch 110 are powered from the DC supply voltage $V_{CC}$. The bidirectional semiconductor switch 212 is coupled in parallel electrical connection with the series combination of the relay 210 and the on-state power supply 220. The off-state power supply 222 is coupled in parallel electrical connection with the relay 210 and the bidirectional semiconductor switch 212 and operates to generate the DC supply voltage $V_{CC}$ when the relay 210 is open and the lighting load 104 is off. The on-state power supply 220 operates to generate the DC supply voltage $V_{CC}$ when the relay 210 is closed and the lighting load 104 is on. The on-state power supply 220 is described in greater detail in U.S. patent application Ser. No. 12/751,324, filed Mar. 31, 2010, entitled SMART ELECTRONIC SWITCH FOR LOW-POWER LOADS, the entire disclosure of which is hereby incorporated by reference.

The output capacitor $C_{OUT}$ is also coupled in series with an over-current detect resistor $R_{OCD}$ (e.g., having a resistance of approximately 0.1Ω) and a positive-temperature-coefficient (PTC) thermistor $R_{PTC}$, which allow for the detection of fault conditions (e.g., an over-current or an over-temperature condition in the electronic switch 110) as described in greater detail in the above-referenced U.S. patent application Ser. No. 12/751,324. The gate drive circuit 216 is response to the voltage generated across the over-current detect resistor $R_{OCD}$, such that the bidirectional semiconductor switch 212 is rendered conductive during an over-current condition (e.g., greater than approximately forty amps) in the output capacitor $C_{OUT}$. The PTC thermistor is thermally coupled to the on-state power supply 220, such that the resistance of the PTC thermistor $R_{PTC}$ increases during an over-temperature condition in the on-state power supply, thus causing the voltage across the PTC thermistor $R_{PTC}$ to increase in magnitude. The relay 210 is responsive to the voltage across the PTC thermistor $R_{PTC}$, such that the relay is rendered non-conductive when the voltage across the PTC thermistor exceeds a predetermined threshold.

The off-state power supply 222 generates the DC supply voltage $V_{CC}$ when the relay 210 is open and the bidirectional semiconductor switch 212 is non-conductive (i.e., the electronic switch 110 is controlling the lighting load 104 to be off) as will be described in greater detail below with reference to FIG. 4. The off-state power supply 222 conducts only a small leakage current $I_{LEAK}$ (i.e., an input charging current) through the lighting load 104, such that the lighting load is not illuminated when the lighting load is supposed to be off. The off-state power supply 222 conducts an off-state charging current $I_{CH-OFF}$ (i.e., an output charging current) through the output capacitor $C_{OUT}$ for charging the output capacitor. The magnitude of the off-state charging current $I_{CH-OFF}$ conducted through the output capacitor $C_{OUT}$ is greater than the magnitude of the leakage current $I_{LEAK}$ conducted through the lighting load 104 as will be described in greater detail below. A current-limit circuit 224 is coupled in series with the off-state power supply 222 and limits the magnitude of the leakage current $I_{LEAK}$ to a maximum leakage current $I_{L-MAX}$ (e.g., less than approximately one mA), such that the lighting load 104 is not illuminated when the relay 210 is non-conductive and the lighting load is supposed to be off.

The on-state power supply 220 generates the DC supply voltage $V_{CC}$ while allowing the electronic switch 110 to provide substantially all of the AC line voltage to the lighting load 104 when the lighting load is on. When the output capacitor $C_{OUT}$ is charging through the on-state power supply 220 (while the relay 210 is conductive), the voltage developed across the on-state power supply has a substantially small magnitude (e.g., approximately the DC supply voltage $V_{CC}$, i.e., approximately five volts) as compared to the peak voltage of the AC line voltage of the AC power source 102. For example, the peak voltage of the AC line voltage is approximately 170 volts when the RMS voltage of the AC power source 102 is 120 $V_{AC}$, while the voltage developed across the on-state power supply 220 is equal to approximately the DC supply voltage $V_{CC}$ (i.e., approximately five volts) for only a portion of each half-cycle of the AC power source 102. The on-state power supply 220 conducts an on-state charging current $I_{CH-ON}$ (FIG. 3) through the output capacitor $C_{OUT}$ for charging the output capacitor. The output capacitor $C_{OUT}$ is adapted to conduct the load current $I_L$ for at least a portion of a line cycle of the AC power source 102 when the relay is conductive (i.e., the on-state charging current $I_{CH-ON}$ is equal to the load current $I_L$ while the output capacitor $C_{OUT}$ is charging).

Figure 3:
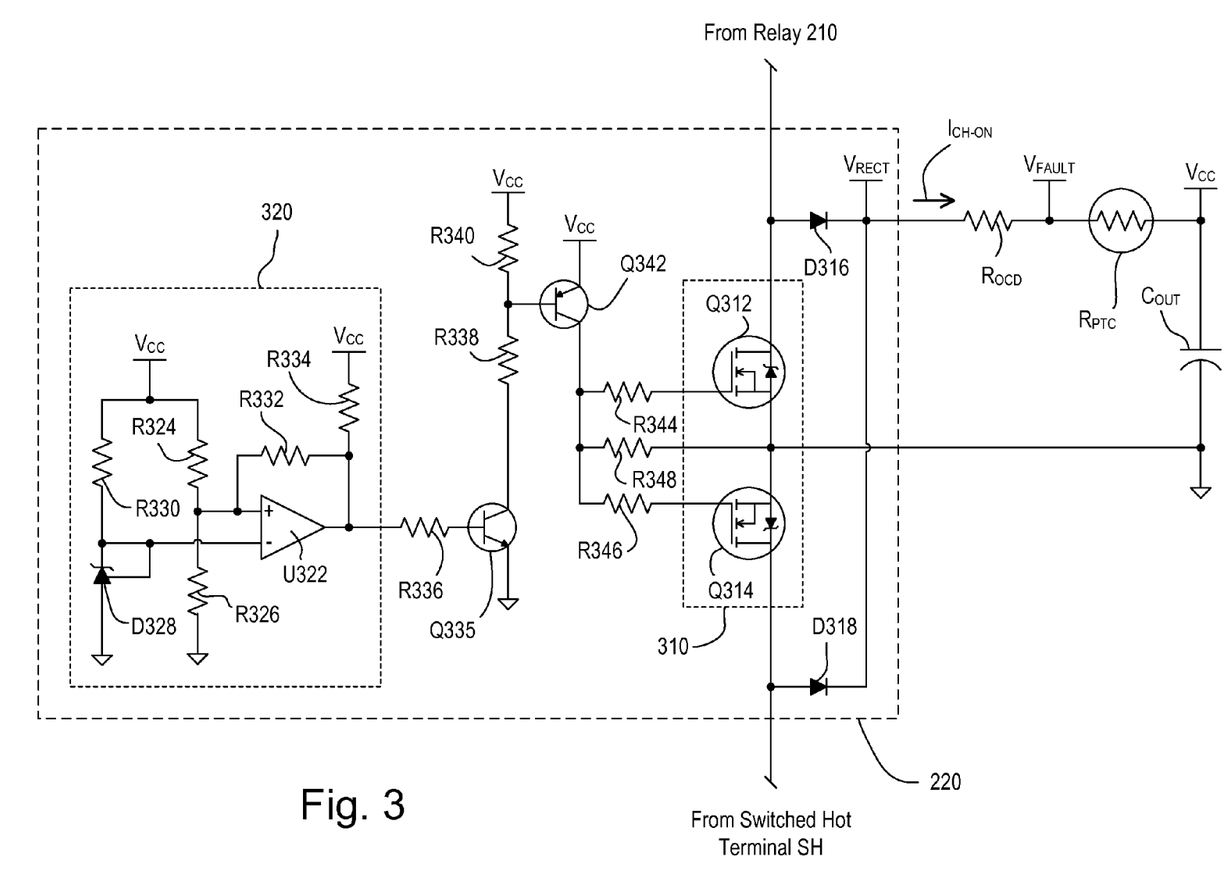
FIG. 3 is a simplified schematic diagram of an in-line on-state power supply of the two-wire electronic switch of FIG. 2.

FIG. 3 is a simplified schematic diagram of the in-line power supply 220 according to the embodiment of the present invention. The on-state power supply 220 includes a bidirectional semiconductor switch 310 comprising, for example, two FETs Q312, Q314 coupled in anti-series connection. The on-state power supply 220 also comprises a full-wave rectifier bridge that includes the body diodes of the two FETs Q312, Q314 in addition to two diodes D316, D318, which are all coupled to the output capacitor $C_{OUT}$, for allowing the output capacitor to charge from the AC power source 102 through the lighting load 104. The rectifier bridge has AC terminals coupled in series between the switched hot terminal SH and the relay 210, and DC terminals for providing a rectified voltage $V_{RECT}$. The output capacitor $C_{OUT}$ is coupled in series between the DC terminals of the rectifier bridge, such that the output capacitor is able to charge from the AC power source 102 through the rectifier bridge and the lighting load 104. The anti-series-connected FETs Q312, Q314 are coupled in parallel electrical connection with the AC terminals of the rectifier bridge, such that the FETs are operable to conduct the load current $I_L$ from the AC power source 102 to the lighting load 104 when the FETs are conductive, and the output capacitor $C_{OUT}$ is operable to conduct the load current $I_L$ when the FETs are non-conductive.

The on-state power supply 220 comprises a control circuit 320, which operates, during normal operation, to render the FETs Q312, Q314 non-conductive to temporarily and briefly block the load current $I_L$. This allows the output capacitor $C_{OUT}$ to conduct the load current $I_L$ and to thus charge for at least a portion of a line cycle of the AC power source 102 when the relay 210 is conductive. Accordingly, the magnitude of the DC supply voltage $V_{cc}$ increases when the bidirectional semiconductor switch 310 is non-conductive and decreases when the bidirectional semiconductor switch is conductive. Specifically, the control circuit 320 renders the FETs Q312, Q314 non-conductive when the magnitude of the DC supply voltage $V_{CC}$ drops to the minimum supply voltage $V_{CC-MIN}$ (i.e., approximately five volts) and renders the FETs conductive when the magnitude of the DC supply voltage $V_{CC}$ rises to the maximum supply voltage $V_{CC-MAX}$ (i.e., approximately six volts). Accordingly, the on-state power supply 220 controls when the output capacitor $C_{OUT}$ is able to charge in a manner that is asynchronous with respect to the frequency of the AC line voltage of the AC power source 102, such that the power supply is operable to start and stop charging at any time during each half-cycle (i.e., at any time between the beginning and the end of the half-cycle).

The control circuit 320 of the on-state power supply 260 comprises, for example, an analog circuit having a comparator U322 for controlling when the FETs Q312, Q314 are conductive in response to the magnitude of the DC supply voltage $V_{CC}$. A resistor divider comprising two resistors R324, R326 is coupled between the DC supply voltage $V_{CC}$ and circuit common and provides a scaled voltage that is representative of the magnitude of the DC supply voltage $V_{CC}$ to the positive terminal of the comparator U322. The resistors R324, R326 may have, for example, resistances of approximately 40.2 kΩ and 11 kΩ, respectively.

The control circuit 320 comprises a shunt regulator D328 (e.g., part number TLV431 manufactured by Texas Instruments) having a cathode connected to the DC supply voltage $V_{CC}$ through a resistor R330 (e.g., having a resistance of approximately 11 kΩ). The cathode of the shunt regulator D328 is coupled to the reference terminal of the shunt regulator and to the negative terminal of the comparator U322, such that a fixed reference voltage (e.g., approximately 1.24 V) is provided at the negative terminal. A resistor R332 (e.g., having a resistance of approximately 47 kΩ) is coupled between the positive terminal and the output terminal of the comparator U322 for providing some hysteresis in the operation of the on-state power supply 220. The output of the comparator U322 is pulled up to the DC supply voltage $V_{CC}$ through a resistor R334 (e.g., having a resistance of approximately 11 kΩ). When the scaled voltage at the positive terminal of the comparator U322 is less than the fixed reference voltage (i.e., 1.24 V) at the negative terminal of the comparator, the output terminal of the comparator U322 is driven low, so as to render the FETs Q312, Q314 non-conductive as will be described below. The comparator U322 may comprise part number LM2903 manufactured by National Semiconductor Corporation.

The output of the comparator U322 is coupled to the base of an NPN bipolar junction transistor Q335 via a resistor R336 (e.g., having a resistance of approximately 22 kΩ). The collector of the transistor Q335 is coupled to the DC supply voltage $V_{CC}$ via two resistors R338, R340 (e.g., having resistances of 100 kΩ and 22 kΩ, respectively). The base of a PNP bipolar junction transistor Q342 is coupled to the junction of the two resistors R338, R340. The collector of the transistor Q342 is coupled to the gates of the FETs Q312, Q314 via two respective gate resistors R344, R346 (e.g., both having a resistance of approximately 8.2 kΩ). When the output terminal of the comparator U322 is pulled high towards the DC supply voltage $V_{CC}$, the transistors Q335, Q342 are both rendered conductive. Accordingly, the DC supply voltage $V_{CC}$ is coupled to the gates of the FETs Q312, Q314 via the respective gate resistors R344, R346, thus rendering the FETs conductive. When the output terminal of the comparator U322 is driven low (i.e., approximately at circuit common) and the transistors Q335, Q342 are rendered non-conductive, the gate capacitances of the gates of the FETs discharge through a resistor R348 (e.g., having a resistance of approximately 8.2 kΩ) and the FETs are rendered non-conductive.

Figure 4:
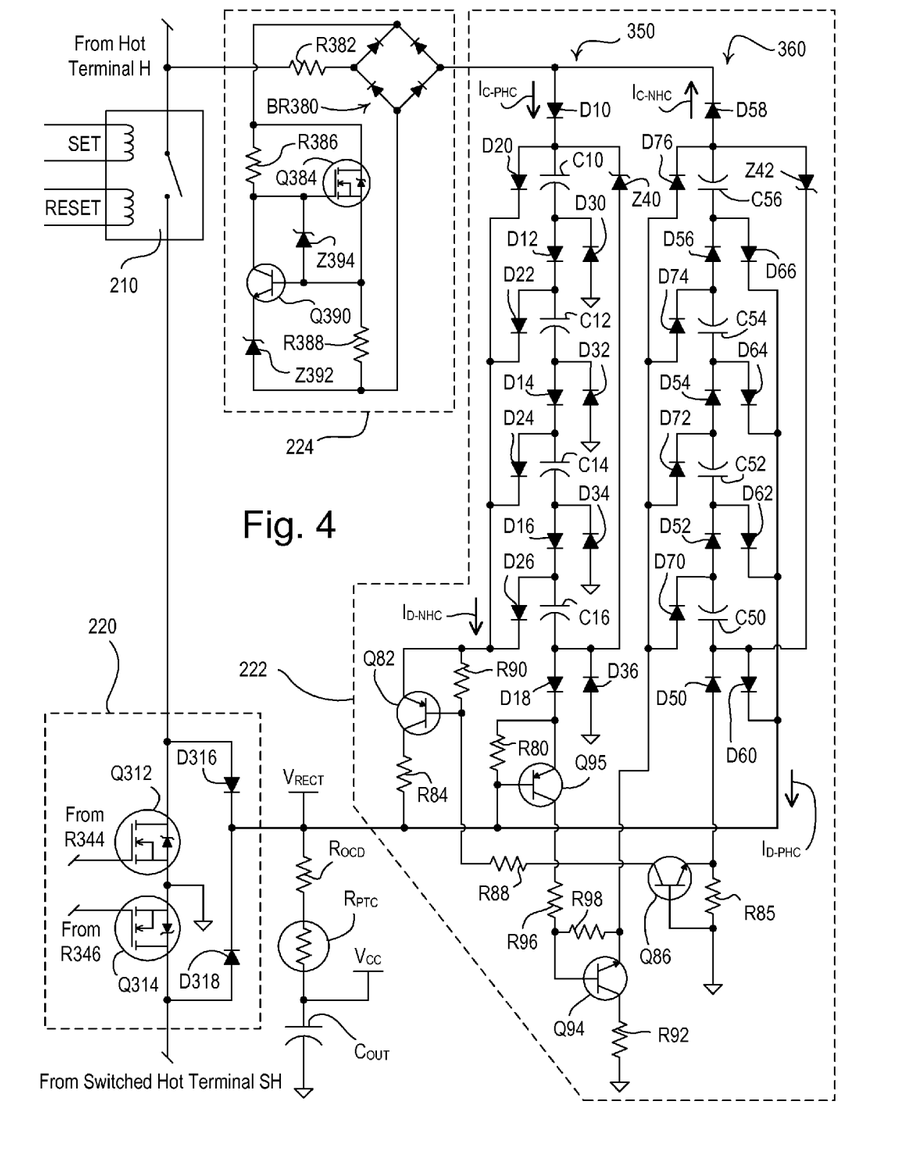
FIG. 4 is a simplified schematic diagram of the electronic switch of FIG. 1 showing an off-state power supply and a current limit circuit in greater detail.

FIG. 4 is a simplified schematic diagram of the electronic switch 110 showing the off-state power supply 222 and the current limit circuit 224 in greater detail. The off-state power supply 222 comprises a switched capacitor circuit (e.g., a charge pump circuit) having a plurality of capacitors that are able to charge in series and discharge in parallel. The switched capacitor circuit is controlled to charge and discharge the capacitors at a predetermined frequency $f_{SW}$, which is a relatively low frequency, such that the off-state power supply does not generate substantial noise that may interfere with the operation of noise-sensitive circuits of the electronic switch 110, such as, for example, the occupancy detection circuit 230 or the RF transceiver.

Figure 5:
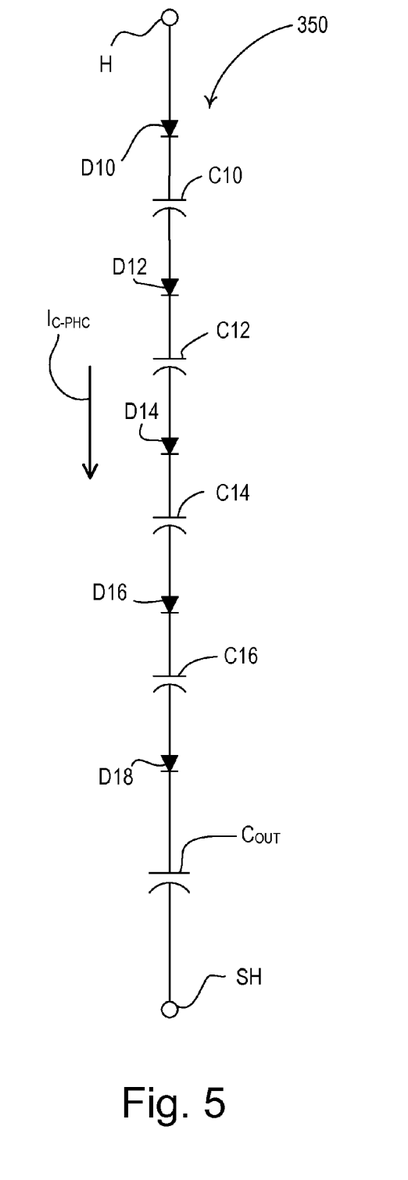
FIG. 5 is a simplified partial schematic diagram illustrating how a plurality of switched capacitors of the off-state power supply of FIG. 4 charge in series.
Figure 6:
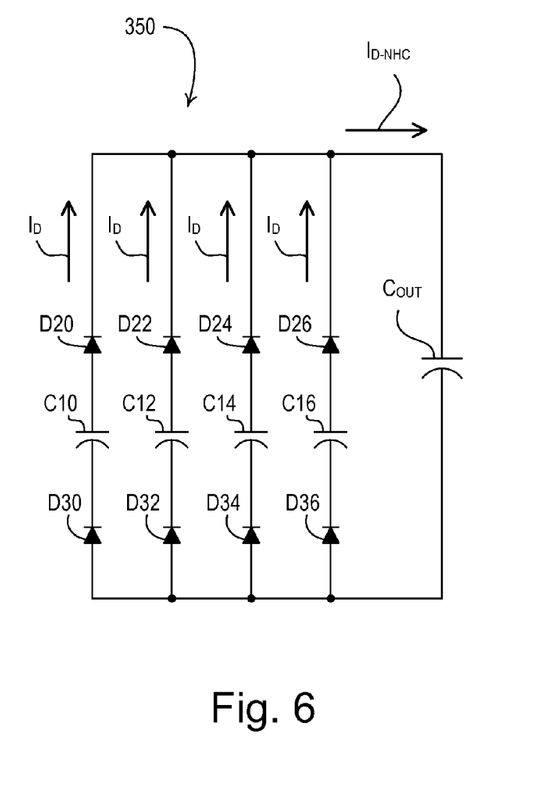
FIG. 6 is a simplified partial schematic diagram illustrating how the plurality of switched capacitors of the off-state power supply of FIG. 4 discharge in parallel.

Specifically, the switched capacitor circuit of the off-state power supply 222 includes a first leg 350 of capacitors C10, C12, C14, C16 that are able to charge in the positive half-cycles of the AC power source 102, and a second leg 360 of capacitors C50, C52, C54, C56 that are able to charge in the negative half-cycles. The capacitors C10-C16, C50-C56 of both legs 350, 360 may each have a capacitance of, for example, approximately 10 µF. The capacitors C10-C16 of the first leg 350 are operable to charge in series during the positive half-cycles by conducting a positive half-cycle charging current $I_{C\text{-}PHC}$ through the lighting load 104 (as illustrated in FIG. 5). In addition, the output capacitor $C_{OUT}$ conducts the positive half-cycle charging current $I_{C\text{-}PHC}$ during the positive half-cycles. The capacitors C10-C16 of the first leg 350 are operable to discharge in parallel into the output capacitor $C_{OUT}$ during the negative half-cycles (as illustrated in FIG. 6). Accordingly, during the negative half-cycles, each of the capacitors C10-C16 conducts an individual discharge current $I_D$, and the output capacitor $C_{OUT}$ conducts a negative half-cycle discharge current $I_{D\text{-}NHC}$, which is the sum of the individual discharge currents $I_D$ of each of the capacitor C10-C16.

Similarly, the capacitors C50-C56 of the second leg 360 are operable to charge in series during the negative half-cycles (by conducting a negative half-cycle charging current $I_{C\text{-}NHC}$ through the output capacitor $C_{OUT}$ and the lighting load 104) and to discharge in parallel into the output capacitor $C_{OUT}$ during the positive half-cycles, such that the output capacitor $C_{OUT}$ conducts a positive half-cycle discharge current $I_{D\text{-}PHC}$, which is the sum of the individual discharge currents $I_D$ of each of the capacitors C50-C56. The leakage current $I_{LEAK}$ conducted through the lighting load 104 is the sum of the positive half-cycle charging current $I_{C\text{-}PHC}$ and the negative half-cycle charging current $I_{C\text{-}NHC}$. Because the positive half-cycle discharge current $I_{D\text{-}PHC}$ and the negative half-cycle discharge current $I_{D\text{-}NHC}$ are not conducted through the lighting load 104, these discharge currents do not form a part of the leakage current $I_{LEAK}$, $$I_{LEAK} = I_{C\text{-}PHC} + I_{C\text{-}NHC}. \quad \text{(Equation 1)}$$

Since the capacitors C10-C16 of the first leg 350 are operable to charge during the positive half-cycles and discharge during the negative half-cycles, and the capacitors C50-C56 of the second leg 360 are operable to charge during the negative half-cycles and discharge during the positive half-cycles, the predetermined switching frequency $f_{SW}$ of the switched capacitor circuit is approximately equal to the line frequency of the AC power source 102, e.g., approximately 60 Hz.

Because the output capacitor $C_{OUT}$ conducts the positive and negative half-cycle charging currents $I_{C\text{-}PHC}$, $I_{C\text{-}NHC}$, as well as the positive and negative half-cycle discharge currents $I_{D\text{-}PHC}$, $I_{D\text{-}NHC}$, the off-state charging current $I_{CH\text{-}OFF}$ is the sum of these currents, i.e., $$I_{CH\text{-}OFF} = I_{C\text{-}PHC} + I_{C\text{-}NHC} + I_{D\text{-}PHC} + I_{D\text{-}NHC}. \quad \text{(Equation 2)}$$

Since each of the positive and negative half-cycle discharge currents $I_{D\text{-}PHC}$, $I_{D\text{-}NHC}$ are the sum of the respective individual discharge currents $I_D$ of the capacitors in each leg 350, 360, the magnitude of the off-state charging current $I_{CH\text{-}OFF}$ is greater than the magnitude of the leakage current $I_{LEAK}$ conducted through the lighting load 104. Accordingly, the off-state power supply 222 can be described as operating as a current multiplier. In other words, the off-state power supply 222 multiplies the leakage current $I_{LEAK}$ by a factor that is dependent upon the number N of capacitors in each leg 350, 360 to generate the off-state charging current $I_{CH-OFF}$ current. Since the output capacitor $C_{OUT}$ conducts the positive and negative half-cycle charging currents $I_{C-PHC}$, $I_{C-NHC}$, as well as the positive and negative half-cycle discharge currents $I_{D-PHC}$, $I_{D-NHC}$, the factor by which the input current is multiplied is one more than the number N of capacitors in each leg 350, 360, i.e., $$I_{CH-OFF}=(N+1)\cdot I_{LEAK}. \quad \text{(Equation 3)}$$

For example, when there are four capacitors in each leg 350, 360 as shown in FIG. 4, the magnitude of the off-state charging current $I_{CH-OFF}$ is five times greater than the magnitude of the leakage current $I_{LEAK}$.

As shown in FIG. 4, the capacitors C10-C16 of the first leg 350 are coupled in series with diodes D10-D18, such there is one diode between each of the capacitors and at each end of the leg. The first leg 350 of capacitors C10-C16 and diodes D10-D18 are coupled to the positive DC terminal of the full-wave rectifier bridge formed by the body diodes of the two FETs Q312, Q314 the diodes D316, D318 of the on-state power supply 220 (i.e., to the rectified voltage $V_{RECT}$) through a resistor R80 (e.g., having a resistance of approximately 56 kΩ). During the positive half-cycles, the first leg 350 of capacitors C10-C16 is operable conduct the positive half-cycle charging current $I_{C-PHC}$ from the hot terminal H, through the current limit circuit 224, the diodes D10-D18, the resistor R80, the over-current detect resistor $R_{OCD}$, the PTC thermistor $R_{PTC}$, the output capacitor $C_{OUT}$, and the body diode of the FET Q314 to the switched hot terminal SH. Accordingly, the capacitors C10-C16 and the output capacitor $C_{OUT}$ are operable to charge in response to conducting the positive half-cycle charging current $I_{C-PHC}$.

A zener diode Z40 is coupled across the first leg 350 of capacitors C10-C16 and operates to limit the voltage generated across the leg to a break-over voltage $V_{BR}$ (e.g., approximately 40 volts). Accordingly, during the positive half-cycles, each of the capacitors C10-C16 of the first leg 350 is operable to charge up to a maximum capacitor voltage $V_{C-MAX}$ (that is slightly less than approximately 10 volts), i.e., $$V_{C-MAX}=[V_{BR}-(N-1)\cdot V_F]/N, \quad \text{(Equation 4)}$$

where $V_F$ is the forward voltage drop of the diodes D12-D16, e.g., approximately 0.7 volts.

The negative terminal of each of the capacitors C10-C16 of the first leg 350 is coupled to circuit common through a respective diode D30-D36. The positive terminal of each of the capacitors C10-C16 of the first leg 350 is coupled to the positive DC terminal of the full-wave rectifier bridge of the on-state power supply 220 (i.e., to the rectified voltage $V_{RECT}$) through a respective diode D20-D26, a first switching device (e.g., a PNP bipolar junction transistor Q82), and a resistor R84 (e.g., having a resistance of approximately 22Ω). Accordingly, when the transistor Q82 is rendered conductive, the capacitors C10-C16 of the first leg 350 are operable to discharge into the output capacitor $C_{OUT}$ during the negative half-cycles as will be described in greater detail below.

The capacitors C50-C56 of the second leg 360 are coupled in series with diodes D50-D58 in a similar manner as the first leg 350. The second leg 360 of capacitors C50-C56 and diodes D50-D58 are coupled to circuit common through a resistor R85 (e.g., having a resistance of approximately 56 kΩ). During the negative half-cycles, the second leg 360 of capacitors C50-C56 is operable conduct the negative half-cycle charging current $I_{C-NHC}$ from the switched hot terminal SH, through the diode D318, the over-current detect resistor $R_{OCD}$, the PTC thermistor $R_{PTC}$, the output capacitor $C_{OUT}$, the resistor R85, the diodes D50-D58, the current limit circuit 224 to the hot terminal H. A zener diode Z42 is coupled across the second leg 360 of capacitors C50-C56 and diodes D50-D58 and has a break-over voltage of, for example, approximately 40 V, such that the zener diode is operable to limit the voltage generated across the second leg and thus limit the voltages across each of the capacitors C50-C56 to the maximum capacitor voltage $V_{C-MAX}$. The positive terminals of the capacitors C50-C56 are coupled to respective diodes D60-D66, while the negative terminals are connected to respective diodes D70-D76, such that the capacitors C50-C56 are operable to discharge into the output capacitor $C_{OUT}$ through a resistor R92 (e.g., having a resistance of approximately 22Ω) and a second switching device (e.g., an NPN bipolar junction transistor Q94) and when the transistor Q94 is rendered conductive during the positive half-cycles as will be described in greater detail below.

The resistor R85 is coupled across the base-emitter junction of an NPN bipolar junction transistor Q86. The collector of the transistor Q86 is coupled to the base of the transistor Q82 through a resistor R88 (e.g., having a resistance of approximately 118 kΩ). A resistor R90 is coupled across the base-emitter junction of the transistor Q82 and has, for example, a resistance of approximately 56 kΩ. When the second leg 360 of capacitors C50-C56 and diodes D50-D58 begins to conduct the negative half-cycle charging current $I_{C-NHC}$ through the resistor R85 during the negative half-cycles, the transistor Q86 is rendered conductive, such that current is conducted through the resistor R90 and the transistor Q82 is rendered conductive. Accordingly, the capacitors C10-C16 of the first leg 350 are operable to discharge into the output capacitor $C_{OUT}$ when the transistor Q82 is rendered conductive during the negative half-cycles.

The resistor R80, which is coupled in series with the first leg 350 of capacitors C10-C16 and diodes D10-D18, is coupled across the base-emitter junction of a PNP bipolar junction transistor Q95. The collector of the transistor Q95 is coupled to the base of the transistor Q94 through a resistor R96 (e.g., having a resistor of approximately 118 kΩ), while a resistor R98 (e.g., having a resistor of approximately 56 kΩ) is coupled across the base-emitter junction of the transistor Q94. When the first leg 350 of capacitors C10-C16 and diodes D10-D18 conducts the positive half-cycle charging current $I_{C-PHC}$ through the resistor R80 during the positive half-cycles, the transistor Q95 is rendered conductive, thus rendering the transistor Q94 conductive and allowing the capacitors C50-C56 of the second leg 360 to discharge into the output capacitor $C_{OUT}$.

As previously mentioned, the current limit circuit 224 is coupled in series with the off-state power supply 222 and limits the magnitude of the leakage current $I_{LEAK}$ to the maximum leakage current $I_{L-MAX}$. The current limit circuit 224 comprises a full-wave rectifier bridge BR380, having AC terminals coupled in series with a resistor R382 (e.g., having a resistance of approximately 1 kΩ) for conducting the leakage current $I_{LEAK}$. The positive DC terminal of the bridge BR380 is coupled to the gate of a FET Q384 through a resistor R386 (e.g., having a resistance of approximately 664 kΩ). Shortly after the beginning of each half-cycle, the FET Q384 is rendered conductive and conducts the leakage current $I_{LEAK}$ through a resistor R388 (e.g., having a resistance of approximately 5.19 kΩ). The resistor R388 is coupled across the series combination of the base-emitter junction of an NPN bipolar junction transistor Q390 and a zener diode Z392 (e.g., having a breakover voltage of approximately 3.9 volts). A zener diode Z394 is coupled between the gate and the drain of the FET Q384 for limiting the magnitude of the voltage at the gate of the FET to thus protect the FET from damage due to overvoltage conditions. When the resistor R388 is conducting the leakage current $I_{LEAK}$, the transistor Q390 is rendered conductive, such that the voltage across the resistor R388 is limited to approximately the rated base-emitter voltage of the transistor Q390 plus the breakover voltage of the zener diode Z392 (i.e., approximately 4.6 volts). Accordingly, the maximum leakage current $I_{L-MAX}$ of the current limit circuit 224 may be, for example, approximately 0.88 milliamps.

While ensuring that the lighting load 104 does not illuminate when the relay 210 is non-conductive, the maximum leakage current $I_{L-MAX}$ of the current limit circuit 224 also helps to helps to reduce the noise generated in the off-state power supply 222. Since the leakage current $I_{LEAK}$ only has a small magnitude, the off-state power supply 222 does not generate substantial noise that may interfere with the operation of the noise-sensitive circuits of the electronic switch 110 (i.e., the occupancy detection circuit 230).

Figure 7:
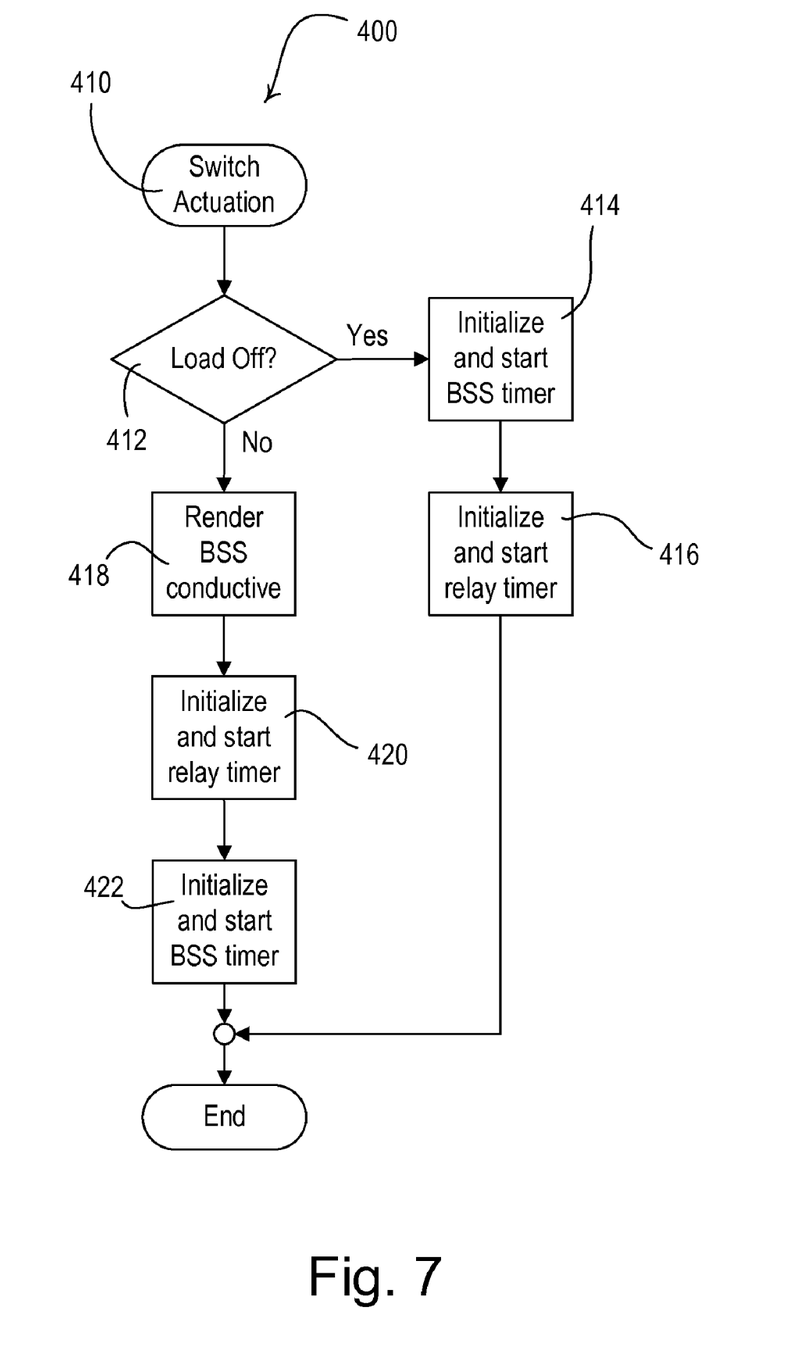
FIG. 7 is a simplified flowchart of a button procedure executed by a controller of the electronic switch of FIG. 2.

FIG. 7 is a simplified flowchart of a button procedure 400 executed by the controller 214 of the electronic switch 110 is response to an actuation of the switch S225 at step 410. The controller 214 uses two timers, e.g., a relay timer and a bidirectional semiconductor switch (BSS) timer, to control when the relay 210 and the bidirectional semiconductor switch 212 become conductive and non-conductive. When the relay timer expires, the controller 214 executes a relay timer procedure 600 to render the relay 210 conductive if the lighting load 104 is off and to render the relay non-conductive if the lighting load is on (as will be described in greater detail below with reference to FIG. 9). When the BSS timer expires, the controller 214 executes a BSS timer procedure 700 to control the bidirectional semiconductor switch 212 to become conductive if the lighting load 104 is off and to become non-conductive if the lighting load is on (as will be described in greater detail below with reference to FIG. 10).

Referring to FIG. 7, if the lighting load 104 is presently off at step 412, the controller 214 turns the load on by initializing the BSS timer to a BSS-turn-on time $t_{BSS-ON}$, and starting the BSS timer decreasing in value with respect to time at step 414. The controller 214 then initializes the relay timer to a relay-turn-on time $t_{RLY-ON}$, and starts the relay timer decreasing in value with respect to time at step 416, before the button procedure 400 exits. For example, the BSS-turn-on time $t_{BSS-ON}$ may be approximately zero milliseconds and the relay-turn-on time $t_{RLY-ON}$ may be approximately thirty milliseconds, such that the bidirectional semiconductor switch 212 will be rendered conductive before the relay 210 is rendered conductive. If the lighting load 104 is presently on at step 412, the controller 214 begins to turn the load off by immediately rendering the bidirectional semiconductor switch 212 conductive at step 418. The controller 214 then initializes the relay timer to a relay-turn-off time $t_{RLY-OFF}$, and starts the relay timer decreasing in value with respect to time at step 420. Finally, the controller 214 initializes the BSS timer to a BSS-turn-off time $t_{BSS-OFF}$, and starts the BSS timer decreasing in value with respect to time at step 422, before the button procedure 400 exits. For example, the relay-turn-off time $t_{RLY-OFF}$ may be approximately thirty milliseconds and the BSS-turn-off time $t_{BSS-OFF}$ may be approximately sixty milliseconds, such that the relay 210 will be rendered non-conductive before the bidirectional semiconductor switch 212 becomes non-conductive.

Figure 8:
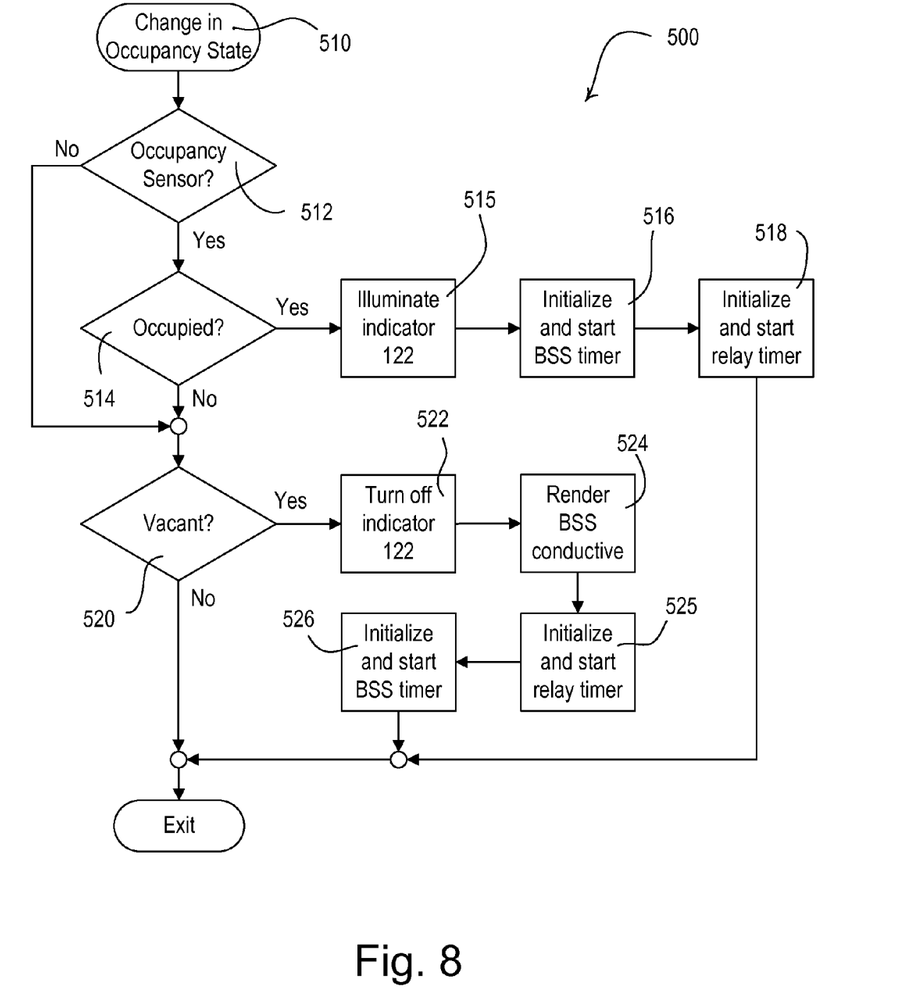
FIG. 8 is a simplified flowchart of an occupancy detection procedure executed by the controller of the electronic switch of FIG. 2.

FIG. 8 is a simplified flowchart of an occupancy detection procedure 500 executed by the controller 214 of the electronic switch 110 whenever the occupancy detection circuit 230 has detected a change in the occupied and vacant states at step 510. If the controller 214 is operating as an occupancy sensor at step 512 and the occupancy detection circuit 230 has just detected that the space has become occupied at step 514, the controller illuminates the occupancy visual indicator 122 at step 515. The controller 214 then turns on the lighting load 104 by initializing and starting the BSS timer (using the BSS-turn-on time $t_{BSS-ON}$) at step 516, and initializing and starting the relay timer (using the relay-turn-on time $t_{RLY-ON}$) at step 518, before the occupancy detection procedure 500 exits.

If the controller 214 is operating as an occupancy sensor at step 512 and the occupancy detection circuit 230 has just detected that the space has become vacant at step 520, the controller turns off the occupancy visual indicator 122 at step 522. The controller 214 then controls the lighting load 104 off by immediately rendering the bidirectional semiconductor switch 212 conductive at step 524, initializing and starting the relay timer (using the relay-turn-off time $t_{RLY-OFF}$) at step 525, and initializing and starting the BSS timer (using the BSS-turn-off time $t_{BSS-OFF}$) at step 526, before the occupancy detection procedure 500 exits. If the controller 214 is operating as a vacancy sensor at step 512, the controller does not respond when the occupancy detection circuit 230 has detected that the space has become occupied at step 514 (i.e., the controller does not execute steps 515-518 when the space is occupied). When the controller 214 is operating as a vacancy sensor at step 512, the controller only turns off the lighting load 104 in response to the occupancy detection circuit 230 detecting that the space has just become vacant at step 520.

Figure 9:
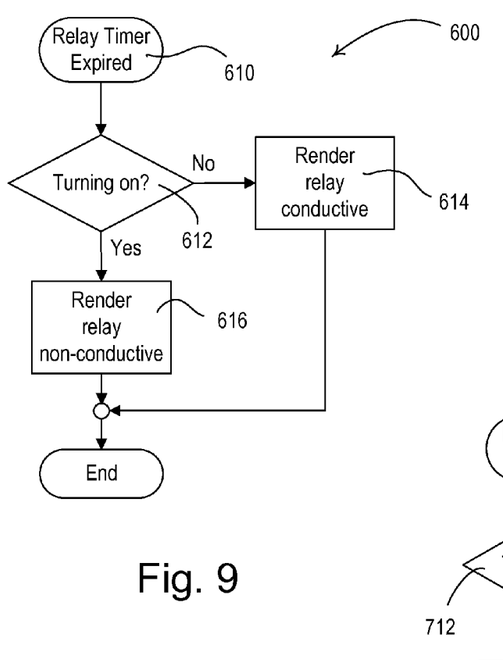
FIG. 9 is a simplified flowchart of a relay timer procedure executed by the controller of the electronic switch of FIG. 2.

FIG. 9 is a simplified flowchart of a relay timer procedure 600 executed by the controller 214 when the relay timer expires at step 610. If the controller 214 is presently turning the lighting load 104 on at step 612, the controller 214 renders the relay 210 conductive at step 614 by conducting current through the SET coil of the relay and the relay timer procedure 600 exits. If the controller 214 is presently turning the lighting load 104 off at step 612, the controller 214 renders the relay 210 non-conductive at step 616 by conducting current through the RESET coil and the relay timer procedure 600 exits.

Figure 10:
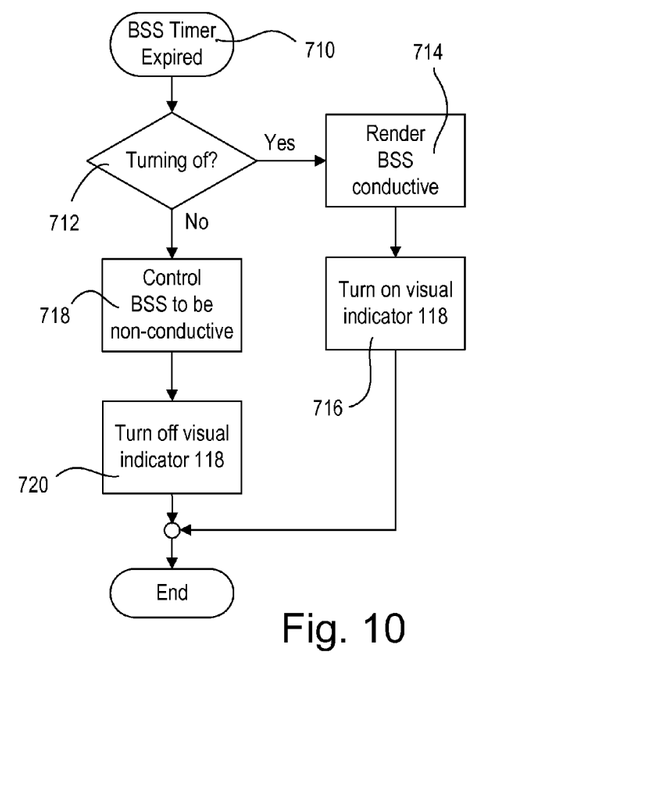
FIG. 10 is a simplified flowchart of a bidirectional semiconductor switch (BSS) timer procedure executed by the controller of the electronic switch of FIG. 2.

FIG. 10 is a simplified flowchart of a BSS timer procedure 700 executed by the controller 214 when the BSS timer expires at step 710. If the controller 214 is presently turning the lighting load 104 on at step 712, the controller 214 controls the drive circuit 216 to render the bidirectional semiconductor switch 212 conductive at step 714 and illuminates the load visual indicator 118 at step 716, before the BSS timer procedure 700 exits. If the controller 214 is presently turning the lighting load 104 off at step 712, the controller 214 controls the drive circuit 216 such that the bidirectional semiconductor switch 212 becomes non-conductive at step 718. The controller 214 then controls the load visual indicator 118 to be off at step 720 and the BSS timer procedure 700 exits.

While the present invention has been described with reference to the electronic switch 110 controlling the power delivered to a connected lighting load, the concepts of the present invention could be used in any type of control device of a load control system, such as, for example, a dimmer switch for adjusting the intensity of a lighting load (such as an incandescent lamp, a magnetic low-voltage lighting load, an electronic low-voltage lighting load, and a screw-in compact fluorescent lamp), a remote control, a keypad device, a visual display device, a controllable plug-in module adapted to be plugged into an electrical receptacle, a controllable screw-in module adapted to be screwed into the electrical socket (e.g., an Edison socket) of a lamp, an electronic dimming ballast for a fluorescent load, and a driver for a light-emitting diode (LED) light source, a motor speed control device, a motorized window treatment, a temperature control device, an audio/visual control device, or a dimmer circuit for other types of lighting loads, such as, magnetic low-voltage lighting loads, electronic low-voltage lighting loads, and screw-in compact fluorescent lamps.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A load control device adapted to be coupled between an AC power source and an electrical load for controlling the power delivered to the electrical load, the load control device comprising:
   a controllably conductive device adapted to be coupled between the source and the electrical load for controlling the power delivered to the electrical load;
   a controller operatively coupled to a control input of the controllably conductive device for rendering the controllably conductive device conductive and non-conductive; and
   a power supply coupled in parallel with controllably conductive device for generating a DC supply voltage for powering the controller when the controllably conductive device is non-conductive, the power supply comprising an energy storage capacitor and a charge pump circuit adapted to conduct an input charging current through the electrical load and to conduct an output charging current through the energy storage capacitor to thus generate the DC supply voltage across the energy storage capacitor, the output charging current having a magnitude greater than the input charging current, the charge pump circuit operating at a switching frequency equal to approximately a line frequency of the AC power source.

2. The load control device of claim 1, wherein the charge pump circuit comprises a first switched capacitor that is operable to charge by conducting the input charging current through the electrical load in a first half-cycle, and to discharge into the energy storage capacitor in a second, subsequent half-cycle, such that the energy storage capacitor conducts the output charging current.

3. The load control device of claim 2, wherein the first switched capacitor is operable to charge during the positive half-cycles of the AC power source, and to discharge into the energy storage capacitor during the negative half-cycles.

4. The load control device of claim 3, wherein the charge pump circuit further comprises a second switched capacitor that is operable to charge during the negative half-cycles, and to discharge into the energy storage capacitor during the positive half-cycles.

5. The load control device of claim 4, further comprising:
   a first switching device coupled between the first switched capacitor and the energy storage capacitor, the first switching device rendered conductive during the negative half-cycles, such that the first switched capacitor discharges into the energy storage capacitor during the negative half-cycles; and
   a second switching device coupled between the second switched capacitor and the energy storage capacitor, the second switching device rendered conductive during the positive half-cycles, such that the second switched capacitor discharges into the energy storage capacitor during the positive half-cycles.

6. The load control device of claim 5, wherein the second switching device is rendered conductive in response to the first switched capacitor conducting the input charging current during the positive half-cycles.

7. The load control device of claim 2, wherein the charge pump circuit comprises a second switched capacitor coupled to the first switched capacitor, such that the first and second switched capacitors conduct the input charging current to charge in series during the first half-cycle.

8. The load control device of claim 7, wherein each of the first and second switched capacitors are operable to conduct a discharge current to discharge in parallel during the negative half-cycles, the energy storage capacitor operable to conduct the discharge current of each of the switched capacitors during the negative half-cycles, such that the energy storage capacitor conducts the output charging current, which is the sum of the discharge currents of the switched capacitors.

9. The load control device of claim 2, further comprising:
   a switching device coupled between the first switched capacitor and the energy storage capacitor, the switching device rendered conductive in response to the first switched capacitor conducting the input charging current during the second half-cycle, such that the first switched capacitor discharges into the energy storage capacitor during the second half-cycle.

10. The load control device of claim 1, further comprising:
    a current limit circuit coupled in series with the charge pump circuit for limiting the magnitude of the input charging current conducted through the electrical load.

11. The load control device of claim 10, wherein the electrical load comprises a lighting load and the current limit circuit limits the magnitude of the input charging current to a maximum input charging current such that the lighting load is not illuminated when the relay is non-conductive.

12. The load control device of claim 11, wherein the maximum input charging current is less than approximately one milliamp.

13. The load control device of claim 1, further comprising:
    an in-line power supply coupled in series with the relay, the in-line power supply further coupled to the energy storage capacitor for controlling when the energy storage capacitor charges in order to generate the DC supply voltage across the energy storage capacitor when the relay is conductive;
    wherein a voltage developed across the in-line power supply when the energy storage capacitor is charging has a substantially small magnitude as compared to a peak voltage of an AC line voltage of the AC power source, the energy storage capacitor adapted to conduct a load current conducted through the relay for at least a portion of a line cycle of the AC power source when the relay is conductive.

14. The load control device of claim 1, further comprising:
    an occupancy detection circuit for detecting the presence or absence of an occupant in the space around the electronic switch;
    wherein the controller is operable to turn the electrical load off in response to the occupancy detection circuit detecting the absence of the occupant in the space.

15. The load control device of claim 14, wherein the controller is operable to turn the electrical load on in response to the occupancy detection circuit detecting the presence of the occupant in the space.

16. The load control device of claim 1, wherein the controllably conductive device comprises a relay adapted to be electrically coupled between the source and the electrical load, the relay rendered conductive to turn the electrical load on and rendered non-conductive to turn the electrical load off, the power supply operable to generate the DC supply voltage when the electrical load is off.

17. A power supply for a two-wire load control device adapted to be coupled between an AC power source and an electrical load for controlling the power delivered to the electrical load, the power supply comprising:
at least two switched capacitors adapted to be electrically coupled in series during a first half-cycle, such that the series-connected capacitors conduct a first charging current, the switched capacitors further adapted to be electrically coupled in parallel during a second, subsequent half-cycle, such that each of the capacitors conduct an individual discharge current; and
an energy storage capacitor operable to store a DC supply voltage and to conduct the discharge currents of each of the switched capacitors during the second half-cycle, such that the energy storage capacitor conducts a second charge current, which is the sum of the discharge currents of the switched capacitors and has a magnitude greater than the magnitude of the first charging current.

18. The power supply of claim 17, further comprising:
a switching device operatively coupled between the switched capacitors and the energy storage capacitor and rendered conductive during the second half-cycle, such that the switched capacitors conduct the discharge currents into the energy storage capacitor when the switching device is conductive during the second half-cycle.

19. The power supply of claim 17, wherein the energy storage capacitor is coupled in series with the switched capacitors during the first half-cycle to conduct the first charging current.

20. The power supply of claim 17, further comprising:
two additional switched capacitors adapted to be electrically coupled in series with each other during the second half-cycle, such that the additional series-connected switched capacitors conduct a third charging current, the additional switched capacitors further adapted to be electrically coupled in parallel during the first half-cycle to each conduct discharge currents into the energy storage capacitor;
wherein, during the first half-cycle, the energy storage capacitor conducts a fourth charge current that has a magnitude greater than the magnitude of the first charging current.

21. A power supply for a two-wire load control device adapted to be coupled between an AC power source and an electrical load for controlling the power delivered to the electrical load, the power supply comprising:
a first switched capacitor operable to charge during the positive half-cycles of the AC power source;
a second switched capacitor operable to charge during the negative half-cycles of the AC power source;
an energy storage capacitor for storing a DC supply voltage, the energy storage capacitor coupled to the first and second switched capacitors, such that the first and second switched capacitors are operable to discharge into the energy storage capacitor during the negative and positive half-cycles, respectively, and the DC supply voltage is produced across the energy storage capacitor;
a first switching device operatively coupled in between the first switched capacitor and the energy storage capacitor and rendered conductive during the negative half-cycles, such that the first switched capacitor is operable to discharge into the energy storage capacitor during the negative half-cycles; and
a second switching device operatively coupled in between the second switched capacitor and the energy storage capacitor and rendered conductive during the positive half-cycles, such that the second switched capacitor is operable to discharge into the energy storage capacitor during the positive half-cycles;
wherein the second switching device is rendered conductive in response to the first switched capacitor charging during the positive half-cycles.

22. The power supply of claim 21, further comprising:
a third switched capacitor electrically coupled in series with the first switched capacitor during the positive half-cycles, such that the first and third switched capacitors conduct a first charging current, the first and third switched capacitors further adapted to be electrically coupled in parallel when the first switching device is rendered conductive during the negative half-cycles, such that the first and third switching capacitors are operable to discharge into the energy storage capacitor in parallel; and
a fourth switched capacitor electrically coupled in series with the second switched capacitor during the negative half-cycles, such that the second and fourth switched capacitors conduct a second charging current, the second and fourth switched capacitors further adapted to be electrically coupled in parallel when the second switching device is rendered conductive during the positive half-cycles, such that the second and fourth switching capacitors are operable to discharge into the energy storage capacitor in parallel.

23. A power supply for a load control device adapted to be coupled between an AC power source and an electrical load for controlling the power delivered to the electrical load, the power supply comprising:
an energy storage capacitor for storing a DC supply voltage;
a switched capacitor circuit comprising a switched capacitor and a switching device, the switched capacitor operable to conduct a charging current through the electrical load when the switching device is non-conductive and a discharge current into the energy storage capacitor when the switching device is conductive, the switching device rendered conductive and non-conductive at a predetermined frequency, such that the DC supply voltage is produced across the energy storage capacitor; and
a current limit circuit coupled in series with the switched capacitor circuit for limiting the magnitude of the charging current.

24. The power supply of claim 23, wherein the predetermined frequency comprises a line frequency of the AC power source.

25. The power supply of claim 24, wherein the switching device is coupled between the switched capacitor and the energy storage capacitor and is rendered conductive during the negative half-cycles of the AC power source.

26. A load control device adapted to be coupled between an AC power source and an electrical load for controlling the power delivered to the electrical load, the load control device comprising:
a controllably conductive device adapted to be coupled between the source and the electrical load for controlling the power delivered to the electrical load;
a controller operatively coupled to a control input of the controllably conductive device for rendering the controllably conductive device conductive and non-conductive;

a noise-sensitive circuit coupled to the controller, such that the controller is responsive to the noise-sensitive circuit; and a power supply coupled in parallel with controllably conductive device for generating a DC supply voltage for powering the controller and the noise-sensitive circuit when the controllably conductive device is non-conductive, the power supply comprising an energy storage capacitor and a switched capacitor circuit adapted to conduct a leakage current through the electrical load and to conduct a discharge current through the energy storage capacitor at a predetermined switching frequency to thus generate the DC supply voltage across the energy storage capacitor;

wherein the magnitude of the leakage current and the predetermined switching frequency are both substantially small so as to avoid generating noise in the noise-sensitive circuit.

27. The load control device of claim 26, wherein the predetermined frequency comprises a line frequency of the AC power source.

28. The load control device of claim 27, wherein the magnitude of the leakage current is less than approximately one milliamp.

29. The load control device of claim 26, further comprising:

a current limit circuit coupled in series with the charge pump circuit for limiting the magnitude of the leakage current conducted through the electrical load.

30. The load control device of claim 26, wherein the noise-sensitive circuit comprises an occupancy detection circuit for detecting the presence or absence of an occupant in the space around the electronic switch, the controller operable to turn the lighting load off in response to the occupancy detection circuit detecting the absence of the occupant in the space.

* * * * *